United States Patent

Kenworthy

Patent Number: 5,255,942
Date of Patent: Oct. 26, 1993

[54] PIPE JOINTS

[75] Inventor: David M. A. Kenworthy, Sheffield, Great Britain

[73] Assignee: Fusion Group PLC, Chesterfield, Great Britain

[21] Appl. No.: 824,533

[22] Filed: Jan. 23, 1992

[30] Foreign Application Priority Data

Jan. 29, 1991 [GB] United Kingdom ............... 9101914

[51] Int. Cl.⁵ .............................................. F16L 47/02
[52] U.S. Cl. ....................................... 285/21; 285/23; 285/92; 285/93; 285/199; 138/89
[58] Field of Search ................... 285/21, 23, 197, 199, 285/93, 92; 137/318; 138/89, 90; 219/535, 544, 8.5; 156/275.1

[56] References Cited

U.S. PATENT DOCUMENTS

| 2,495,615 | 1/1950 | Vander Clute | 285/21 |
| 2,736,335 | 2/1956 | Webber | 137/318 |
| 3,583,458 | 6/1971 | Costa | 219/8.5 |
| 3,784,235 | 1/1974 | Kessler et al. | 285/21 |
| 4,018,246 | 4/1977 | Langstroth | 285/197 X |
| 4,059,291 | 11/1977 | Acda et al. | 285/197 |
| 4,455,482 | 6/1984 | Grandclément | 285/21 X |
| 4,622,087 | 11/1986 | Ansell | 219/535 X |
| 4,655,480 | 4/1987 | Thalmann | |
| 4,684,417 | 8/1987 | Grandclement | 219/535 X |
| 4,708,374 | 11/1987 | Cox | 285/197 X |
| 5,150,922 | 9/1992 | Nakashiba et al. | 285/21 |

FOREIGN PATENT DOCUMENTS

| 8521528 | 10/1985 | Fed. Rep. of Germany . |
| 3928843 | 3/1991 | Fed. Rep. of Germany . |
| 528697 | 11/1972 | Switzerland ...................... 285/21 |
| 1408844 | 10/1975 | United Kingdom . |

Primary Examiner—Dennis L. Taylor
Assistant Examiner—Heather Chun
Attorney, Agent, or Firm—Watson, Cole, Grindle & Watson

[57] ABSTRACT

A closure for sealing the cutter guide tube of a pipe saddle fitting comprises a cap of thermoplastic material having a screw-threaded section (5) to enable releasable attachment of the closure to the tube, and a section (6) with a cylindrical surface incorporating a heating coil (8) to which a welding current is delivered to fix the closure permanently to the tube when the pipe joint has been completed and tested.

8 Claims, 2 Drawing Sheets

PIPE JOINTS

BACKGROUND OF THE INVENTION

1. Field of the Invention

This invention relates to pipe joints, and in particular is concerned with so-called saddle fittings for making branch connections to a main pipe of thermoplastic material such as polyethylene.

2. The Prior Art

The known saddle fittings currently in use comprise a generally semi-cylindrical thermoplastic saddle portion with a concave surface of a curvature complementary to the external dimension of the main pipe to which it is to be fastened by welding. At a substantially central position the saddle portion includes a hole, and an integral tube which is connected to the saddle portion around the hole and projects essentially radially from the convex surface of the saddle portion. Connected to the tube intermediate its ends is a lateral spigot providing a connection for attachment of the branch pipe. For welding the saddle fitting to the main pipe it can be provided with a resistance heating coil located at the concave surface of the saddle portion and extending around the hole therein, and contacts for connecting the heating wire to a suitable source of electric current. The heat generated by the welding current flowing through the heating coil causes the thermoplastic material of the main pipe and saddle portion, as their abutting surfaces, to melt so that upon subsequent cooling the main pipe and saddle portion are fused securely together. In order to open up communication with the interior of the main pipe a cutter is advanced along the tube of the saddle fitting so that its leading cutting edge passes through the hole in the saddle portion and servers a circular hole through the wall of the main pipe. Conveniently, the tube and the cutter are provided with complementary screw threads to facilitate the advancement and cutting action of the cutter by rotation of the cutter by means of an appropriate tool engaged therewith. When the hole has been cut through the main pipe, the cutter is withdrawn and the outer end of the tube is closed off by a closure, such as a plug or cap adapted for sealing engagement with the free end of the tube. When the branch pipe has been correctly secured to the connection spigot, the resultant pipe joint is ready for testing prior to use.

The closures normally used for sealing the end of the saddle fitting tube are detachably mounted on the tube end, such as by a screw-threaded connection. This is advantageous since, for example, if a joint is found unsatisfactory during testing because the main pipe has not been cut through correctly, the closure can be removed and replaced again after repeating the cutting operation. On the other hand, it means the closure can also be removed subsequent to satisfactory testing and should it not be re-applied correctly the pipe joint could leak, whereas no fault was indicated during testing.

In GA-A-1408844 there is disclosed a closure in the form of a plug with a spring ring which engages an annular groove within the tube to lock the plug fixedly in place. This construction prevents removal of the plug after it has been inserted, but means the plug cannot be removed for checking purposes if tests on the joint give unsatisfactory results. Furthermore, it means the plug must be supplied detached from the fitting, which carries the inherent risk that it will be lost or mislaid in the field before the saddle jointing procedure is completed.

SUMMARY OF THE INVENTION

The present invention provides a solution to these drawbacks and resides in a closure member for the cutter guide tube of a pipe saddle fitting, comprising means for secure but releasable engagement of the closure member with the tube, an electrical resistance heating wire incorporated in a thermoplastic portion of the member at a surface thereof arranged for contact with a surface of the tube, and electric contact means for supplying a electric current to the heating wire for fastening the closure permanently to the tube by welding.

The closure member of the invention retains all the benefits of a selectively detachable closure, but when a completed joint has been satisfactorily tested, it can be permanently fixed in place so that the closure cannot be tampered with.

The closure member may be cap shaped to fit over the end of the tube, but can comprise a plug adapted to fit within an end portion of the tube. Conveniently, the releasable engagement means comprises a screw thread. In the case of a closure plug, it can be externally threaded for cooperation with the same screw thread as provided in the tube for advancing the cutter.

The heating coil can be located closely adjacent the threaded surface of the closure since the threaded surfaces of the closure and tube will be in close cooperation and help to ensure a secure weld. However, in a preferred construction the heating coil is located at a cylindrical surface axially spaced from the screw thread for ease of manufacture.

An embodiment of the invention is described below by way of example with reference to the accompanying drawings,

DETAILED DESCRIPTION OF THE PREFERRED EMBODIMENT

Figure 1:
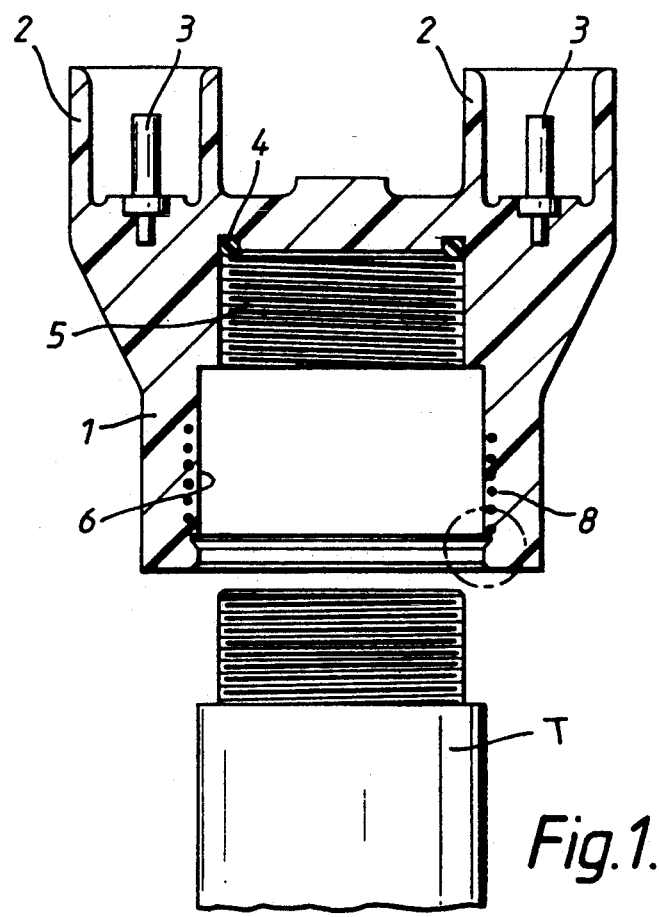
FIG. 1 is an axial section through a closure according to the invention.

The closure member depicted in the drawings comprises a cup-shaped body 1 of thermoplastic material. Integral with the body and located diametrically opposite each other are a pair of socket housings 2 accommodating central contact pins 3 which have their lower ends embedded in the material of the body. The cavity defined within the cap is cylindrical and shaped for cooperation with the exterior of the cutter guide tube T of an electro-fusion saddle fitting. It includes an inner section 5 with a screw thread for releasable cooperation with a complementary screw thread on the tube. The end wall of this threaded section has an annular groove in which an O ring seal 4 is accommodated. The cavity also includes a lower or outer section 6 with a generally smooth cylindrical surface, and embedded in the material of the body closely adjacent this surface is an electrical resistance heating coil 8, the ends of which are respectively connected to the contact pins 3.

Figure 4:
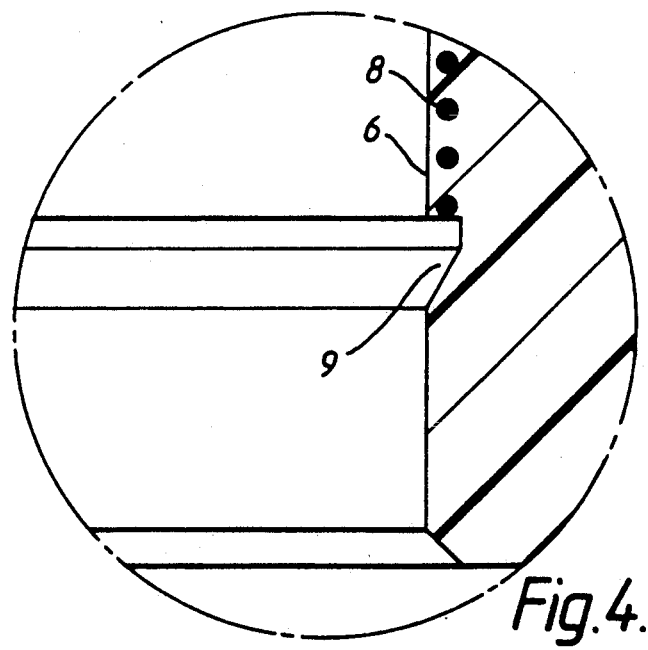
FIG. 4 shows a detail of FIG. 1 on an enlarged scale.
Figure 2:
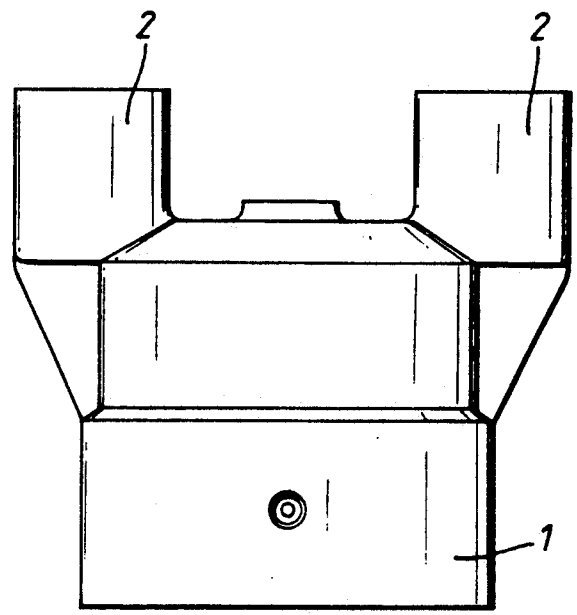
FIG. 2 is a front elevation of the closure.
Figure 3:
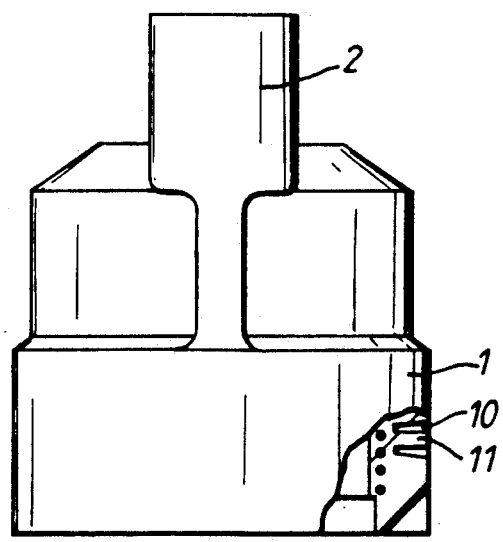
FIG. 3 is a side elevation shown partially in section.

In a manner known per se for production of electro-fusion sleeve fittings, a coil of coated wire can be would onto a mandrel and the body injection moulded over the mandrel so that the wire becomes embedded into the material of the body. The small groove 9 seen in FIG. 4 is that left by a flange formed on the mandrel for holding the wire coil in place during the moulding process.

By virtue of the screw thread the cap can be releasably yet securely attached to a saddle fitting. Thus, it can be secured to the fitting device storage and transit yet is easily detached, e.g. to enable insertion and subsequent withdrawal of the cutter. It may be re-applied to seal closed the end of the fitting tube for testing purposes, the seal 4 assisting the fluid tightness of the cap when it is screwed on to the fitting, and when ready the closure can be fixed permanently in place by welding the closure to the tube by connecting the contact pins 3 to a suitable source of electric current, the welded join then providing a reliable permanent seal.

As shown the closure cap also includes an indicator to indicate that the closure cap has been welded in place. A circular groove 10 is formed in the side wall of the cap, the groove terminating near the heating coil and surrounding a peg 11 integral with the body. The pressure built up during the welding operation causes the peg 11 to be forced outwardly and to project from the cap, thereby to provide the required indication.

Modifications to the described cap are possible without departing from the scope of the invention. For example, a screw thread is not essential and other forms of mechanical fastening may be used to secure the cap releasably to the fitting, such as a bayonet type fastening, although the fitting will need to be suitably adapted to receive the cap.

I claim:

1. A closure member for a cutter guide tube of a pipe saddle fitting, comprising a means for releasably securing said closure member with said guide tube so as to sealingly close a free end of said guide tube, said closure member having a thermoplastic portion at a surface thereof arranged for contact with said guide tube, and an electrical resistance heating wire incorporated in said thermoplastic portion and connected to electric contact means for supplying current to a heating wire for fastening said closure member permanently to said guide tube by welding.

2. A closure member according to claim 1, wherein the means for securing the member releasably to the tube comprises a screw thread.

3. A closure member according to claim 1, wherein the heating wire is positioned at a substantially cylindrical surface of the member.

4. A closure member according to claim 1, wherein the member comprises a body of thermoplastic material including an integral weld indicator.

5. A closure member according to claim 1, wherein the contact means comprises a pair of shrouds which each houses a respective contact means.

6. A closure means for closing a cutter guide tube of a pipe saddle fitting, comprising a screw thread for releasably securing said closure means with said guide tube for said closure means to seal closed the guide tube, the said means having a thermoplastic portion at a substantially cylindrical surface thereof spaced axially from the screw thread and arranged for contact with the tube, and an electrical resistance heating wire incorporated in said thermoplastic portion and connected to electric contact means for supplying current to the heating wire for fastening the closure permanently to the tube by welding.

7. A closure member according to claim 6, wherein the member is a cap with an internal cavity having an inner section formed with the screw thread and an outer section defining the cylindrical surface.

8. A pipe saddle fitting including a combination of a cutter guide tube that has a free end and a closure member for sealing closed a free end of the tube; said closure member comprising a means for releasably securing said closure member with said guide tube so as to sealingly close said free end of said guide tube, said closure member having a thermoplastic portion at a surface thereof arranged for contact with said guide tube, and an electrical resistance heating wire incorporated in said thermoplastic portion and connected to electric contact means for supplying current to a heating wire for fastening said closure member permanently to said guide tube by welding.

* * * * *